United States Patent
Ruff

(10) Patent No.: US 10,344,712 B2
(45) Date of Patent: Jul. 9, 2019

(54) ROCKET MOTOR ASSEMBLY

(71) Applicant: Martin Baker Aircraft Co. Ltd., Middlesex (GB)

(72) Inventor: Stephen Ruff, Chesham (GB)

(73) Assignee: Martin Baker Aircraft Co. Ltd, Middlesex (GB)

( * ) Notice: Subject to any disclaimer, the term of this patent is extended or adjusted under 35 U.S.C. 154(b) by 289 days.

(21) Appl. No.: 15/457,238

(22) Filed: Mar. 13, 2017

(65) Prior Publication Data

US 2018/0223771 A1    Aug. 9, 2018

(30) Foreign Application Priority Data

Mar. 16, 2016   (GB) .................................. 1604485.1

(51) Int. Cl.
| | | |
|---|---|---|
| *B64D 25/10* | (2006.01) | |
| *F02K 9/80* | (2006.01) | |
| *B64D 25/12* | (2006.01) | |
| *F02K 9/00* | (2006.01) | |
| *F02K 9/34* | (2006.01) | |

(52) U.S. Cl.
CPC .............. *F02K 9/805* (2013.01); *B64D 25/10* (2013.01); *B64D 25/12* (2013.01); *F02K 9/00* (2013.01); *F02K 9/343* (2013.01); *F02K 9/80* (2013.01)

(58) Field of Classification Search
CPC ......... B64D 25/10; B64D 25/12; F02K 9/343; F02K 9/80
USPC .................................................. 244/122 AD
See application file for complete search history.

(56) References Cited

U.S. PATENT DOCUMENTS

| | | | | | |
|---|---|---|---|---|---|
| 2,996,272 | A | * | 8/1961 | Stott ...................... | B64D 25/10 244/122 AD |
| 3,190,589 | A | * | 6/1965 | Jorgen ................... | B64D 25/10 244/122 AB |
| 3,285,543 | A | * | 11/1966 | Koochembere ........ | B64D 25/10 244/122 AE |

(Continued)

FOREIGN PATENT DOCUMENTS

| | | | | | |
|---|---|---|---|---|---|
| GB | | 986745 A | * | 3/1965 | ............. B64D 25/10 |
| GB | | 1105379 A | * | 3/1968 | ............. B64D 25/10 |

(Continued)

OTHER PUBLICATIONS

UK Search Report dated Jul. 25, 2016.

*Primary Examiner* — Christopher P Ellis
(74) *Attorney, Agent, or Firm* — Phillips Lytle LLP; David L. Principe

(57) ABSTRACT

A rocket motor assembly (3) for use with an aircraft ejection seat comprises a rocket motor (4) having a rocket motor housing (5) and an exhaust outlet (6-9) to permit exhaust gas to be output from the rocket motor (4) along a thrust vector. The rocket motor assembly (3) comprises a first rotational coupling (12) which is configured to rotationally couple a first part (13) of the rocket motor housing (5) to a support structure (10) and a releasable coupling (14) which is configured to releasably couple a second part (15) of the rocket motor housing (5) to the support structure (10). The releasable coupling (14) is configured to release the second part (15) of the rocket motor housing (5) to permit the rocket motor housing (5) to rotate about the rotational coupling (12) to change the angle of the thrust vector of exhaust gas output from the exhaust outlet (6-9).

21 Claims, 10 Drawing Sheets

(56) References Cited

U.S. PATENT DOCUMENTS

| | | | | |
|---|---|---|---|---|
| 3,487,445 A * | 12/1969 | McIntyre | ............... | B64D 25/10 244/122 AD |
| 3,726,499 A * | 4/1973 | Stencel | ............... | B64D 17/383 244/122 AD |
| 3,740,005 A * | 6/1973 | Rivers | .................... | B64D 25/10 244/122 AD |
| 3,833,191 A * | 9/1974 | Morton | .................. | B64D 25/10 244/122 A |
| 3,952,664 A * | 4/1976 | Schmidt | .................... | F02K 9/30 60/256 |
| 4,236,687 A * | 12/1980 | Stone | ..................... | B64D 25/10 244/122 AD |
| 4,303,212 A * | 12/1981 | Stone | ..................... | B64D 25/10 244/122 A |
| 4,655,417 A * | 4/1987 | Herndon | ................ | B64D 25/10 244/122 A |
| 4,667,903 A * | 5/1987 | Herndone | .............. | B64D 25/10 244/122 A |
| 4,721,273 A * | 1/1988 | Trikha | ................... | B64D 25/10 244/122 AB |
| 4,749,154 A * | 6/1988 | Herndon | ................ | B64D 25/10 244/122 AB |
| 5,133,515 A | 7/1992 | Strattan et al. | | |
| 6,591,602 B1 * | 7/2003 | Ruff | ....................... | B64D 25/10 244/122 AD |
| 7,578,472 B2 * | 8/2009 | Mastrolia | ............... | B64D 25/10 244/122 A |

FOREIGN PATENT DOCUMENTS

| | | | |
|---|---|---|---|
| GB | 1334521 A | 10/1973 | |
| GB | 2438742 A | 5/2007 | |

* cited by examiner

ROCKET MOTOR ASSEMBLY

The present invention relates to a rocket motor assembly, and more particularly relates to a rocket motor assembly for use with an aircraft ejection seat.

Figure 1:
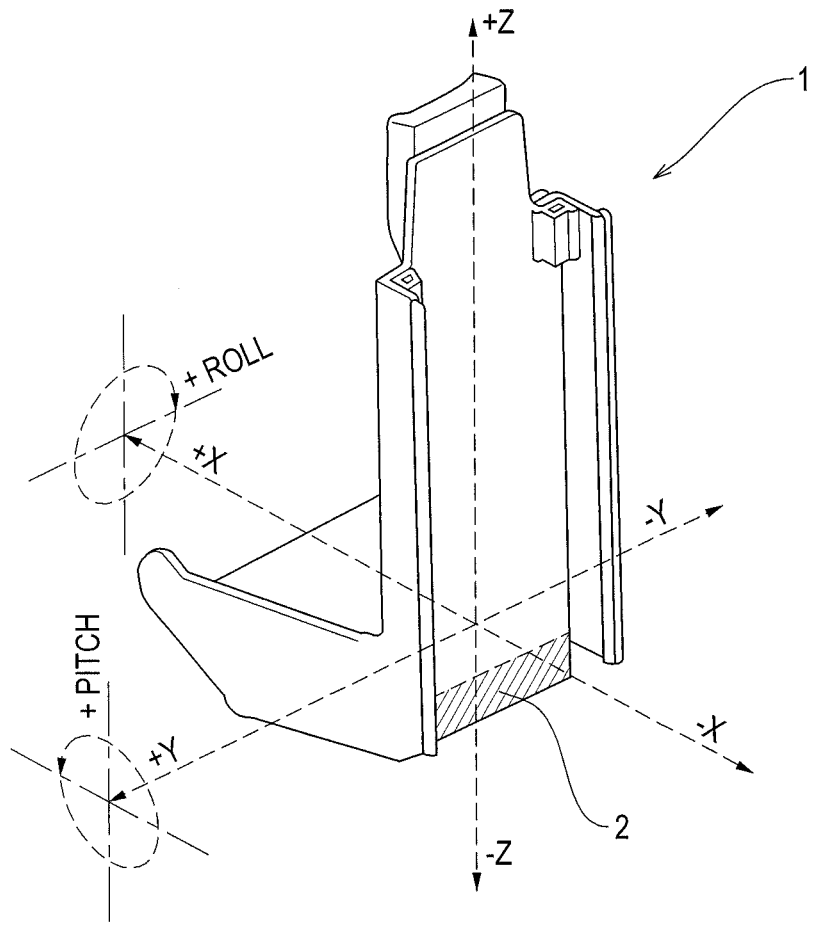

Referring to FIG. 1 of the accompanying drawings, an aircraft ejection seat 1 comprises an under-seat rocket motor 2 which is positioned beneath the squab of the seat. Upon activation, the rocket motor 2 provides a thrust force to eject the seat from an aircraft. As the ejection seat 1 leaves the aircraft, the ejection seat 1 will be subjected to forces from the movement of the aircraft and from the wind on the outside of the aircraft. These forces cause the ejection seat 1 to undergo pitch and roll movements about the X and Y axes, as indicated in FIG. 1.

The pitch and roll of the ejection seat 1 needs to be controlled in order to stabilise the motion of the ejection seat and ensure the safety of the occupant of the seat. The degree of pitch and roll is affected by multiple factors, including the mass of the occupant, the centre of gravity and also the drag areas. These factors, in turn, impact the seat stability, trajectory and occupant acceleration.

It is known to use thrust vectoring to stabilise and correct the trajectory and acceleration of an ejection seat. Thrust vectoring is typically carried out using baffles which are moved across the gas output of the rocket motor to deflect exhaust gases and change the angle of the thrust vector. This, in turn, adjusts the pitch and roll of the ejection seat.

While the conventional arrangement described above is effective in stabilising an ejection seat, the arrangement is often complex, expensive and heavy. The baffles are prone to erosion in the harsh environment of the rocket motor gas efflux. The other moving parts in the arrangement also require routine maintenance to ensure correct operation.

There is a need for an improved rocket motor assembly for use with an aircraft ejection seat.

The present invention seeks to provide an improved rocket motor assembly.

According to one aspect of the present invention, there is provided a rocket motor assembly for use with an aircraft ejection seat, the rocket motor assembly comprising: a rocket motor which incorporates: a rocket motor housing; and an exhaust outlet provided on the rocket motor housing to permit exhaust gas to be output from the rocket motor along a thrust vector; wherein the rocket motor assembly further comprises: a first rotational coupling which is configured to rotationally couple a first part of the rocket motor housing to a support structure; and a releasable coupling which is configured to releasably couple a second part of the rocket motor housing to the support structure such that the rocket motor housing is held relative to the support structure with the thrust vector of exhaust gas output from the exhaust outlet at a first angle relative to a first plane of the support structure; wherein the releasable coupling is configured, upon receipt of a first activation signal, to release the second part of the rocket motor housing from the support structure to permit the rocket motor housing to rotate about the rotational coupling so that the rocket motor housing moves relative to the support structure so that the thrust vector of exhaust gas output from the exhaust outlet is at a second angle relative to the first plane of the support structure.

Preferably, the rocket motor assembly further comprises: a support structure which is coupled to the rocket motor housing by the first rotational coupling and the releasable coupling.

Conveniently, the rocket motor housing is configured to move into contact with a blocking element which is configured to be carried by the support structure at a predetermined position.

Advantageously, the blocking element provides a second rotational coupling between the rocket motor housing and the support structure.

Preferably, the first rotational coupling is also a second releasable coupling which is configured, upon receipt of a second activation signal, to release the first part of the rocket motor housing from the support structure to permit the rocket motor housing to rotate about the second rotational coupling provided by the blocking element so that the rocket motor housing moves relative to the support structure so that the thrust vector of exhaust gas output from the exhaust outlet is at a third angle relative to the first plane of the support structure.

Conveniently, the third angle is substantially the same as the first angle relative to the first plane of the support structure.

Advantageously, the rocket motor assembly further comprises: a third rotational coupling which is configured to rotationally couple a third part of the rocket motor housing to the support structure; a third releasable coupling which is configured to releasably couple a fourth part of the rocket motor housing to the support structure; wherein the third releasable coupling is configured, upon receipt of a third activation signal, to release the fourth part of the rocket motor housing from the support structure to permit the rocket motor housing to rotate about the third rotational coupling so that the rocket motor housing moves relative to the support structure and so that the thrust vector of exhaust gas output from the exhaust outlet is at a fourth angle relative to a second plane of the support structure, wherein the second plane is perpendicular to the first plane.

Preferably, the rocket motor housing is configured to move into contact with a further blocking element which is configured to be carried by the support structure at a predetermined position.

Conveniently, the further blocking element provides a fourth rotational coupling between the rocket motor housing and the support structure.

Advantageously, the third rotational coupling is also a fourth releasable coupling, which is configured, upon receipt of a third activation signal, to release the third part of the rocket motor housing from the support structure to permit the rocket motor housing to rotate about the fourth rotational coupling provided by the further blocking element so that the rocket motor housing moves relative to the support structure so that the thrust vector of exhaust gas output from the exhaust outlet is at a fifth angle relative to the second plane of the support structure.

Preferably, each releasable coupling comprises: a locking element which is configured to be moved by an actuator between a locked position in which the locking element restricts translational movement of the rocket motor housing relative to the support structure and an unlocked position which permits translational movement of the rocket motor housing relative to the support structure.

Conveniently, the actuator is a piston and cylinder arrangement that is activated by a source of gas.

Advantageously, the source of gas is a pyrotechnic gas generator.

Preferably, the source of gas is remote from the rocket motor.

Conveniently, the locking element comprises: a locking portion which is configured to engage with part of the rocket motor housing and part of the support structure to restrict translational movement of the rocket motor housing relative to the support structure; and a frangible portion which is configured to be broken by a force which is exerted by the support structure on the frangible portion that is above a predetermined level to permit translational movement of the rocket motor housing relative to the support structure.

Advantageously, the rocket motor housing is driven to move relative to the support structure by the thrust force of gas output from the rocket motor.

Preferably, the rocket motor assembly further comprises a control arrangement which incorporates: an output that is configured to provide activation signals to each of the releasable couplings; a gyroscopic sensor; a processing unit that is configured to receive signals from the gyroscopic sensor, calculate the pitch or roll rate of the support structure and, if the pitch or roll rate is higher than a predetermined level, to provide an activation signal to at least one of the releasable couplings.

Conveniently, the control arrangement is configured to provide activation signals to a plurality of the releasable couplings in a predetermined sequence.

Advantageously, the support structure is configured to be carried by an aircraft seat.

According to another aspect of the present invention, there is provided an aircraft seat comprising the rocket motor assembly of claim 1 as defined hereinafter.

According to a further aspect of the present invention, there is provided method of operating a rocket motor assembly for use with an aircraft ejection seat, wherein the rocket motor assembly comprises: a rocket motor which incorporates: a rocket motor housing; and an exhaust outlet provided on the rocket motor housing to permit exhaust gas to be output from the rocket motor along a thrust vector; a first rotational coupling which is configured to rotationally couple a first part of the rocket motor housing to a support structure; and a releasable coupling which is configured to releasably couple a second part of the rocket motor housing to the support structure such that the rocket motor housing is held relative to the support structure with the thrust vector of exhaust gas output from the exhaust outlet at a first angle relative to a first plane of the support structure; wherein the method comprises: activating the releasable coupling to release the second part of the rocket motor housing from the support structure to permit the rocket motor housing to rotate about the rotational coupling so that the rocket motor housing moves relative to the support structure so that the thrust vector of exhaust gas output from the exhaust outlet is at a second angle relative to the first plane of the support structure.

Figure 2:
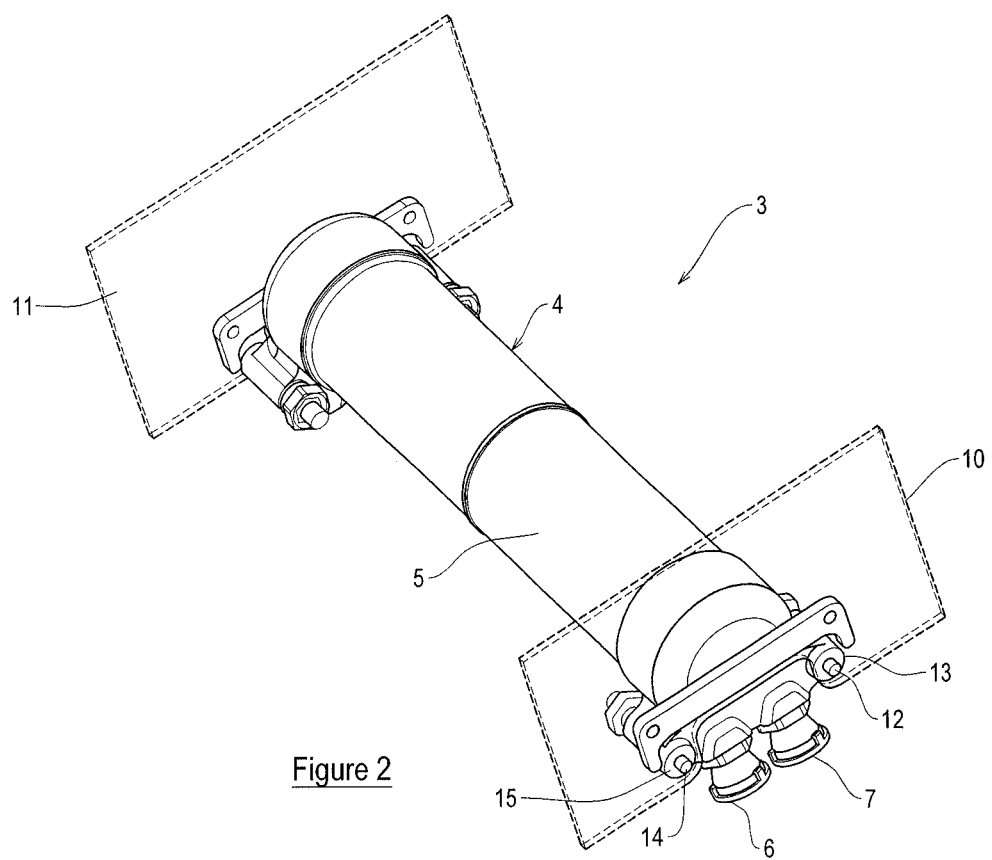
Figure 3:
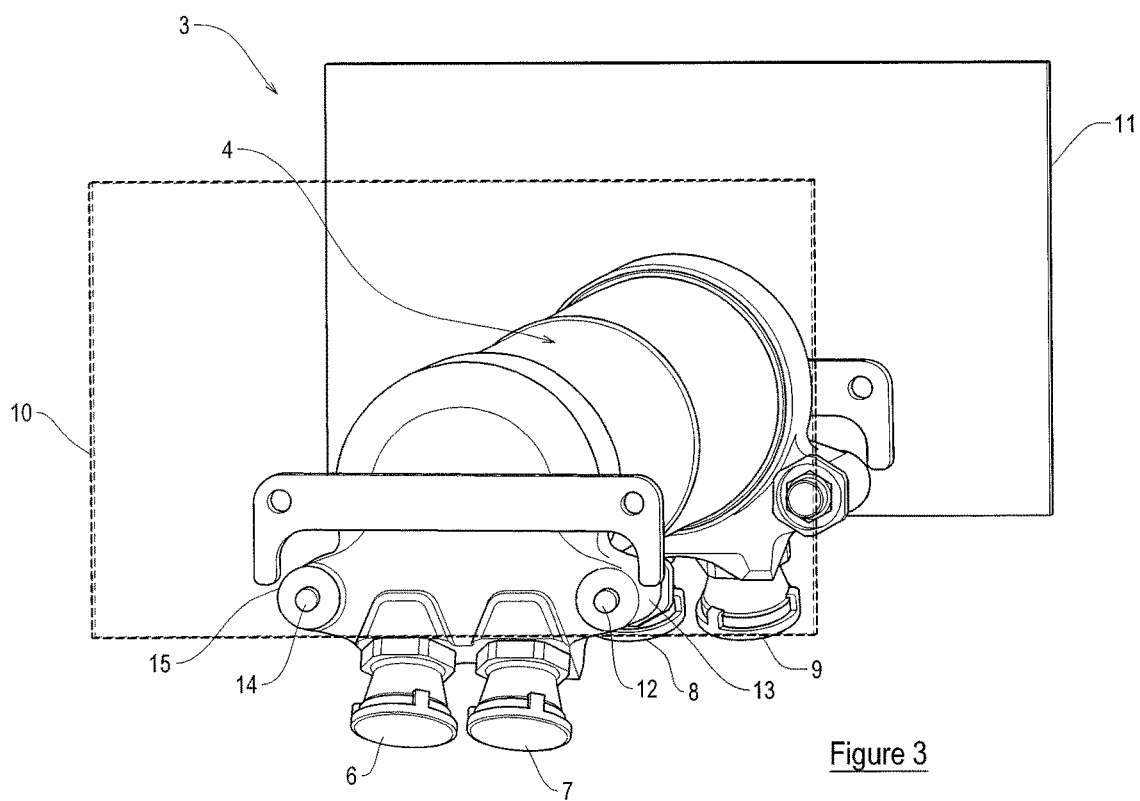
Figure 4:
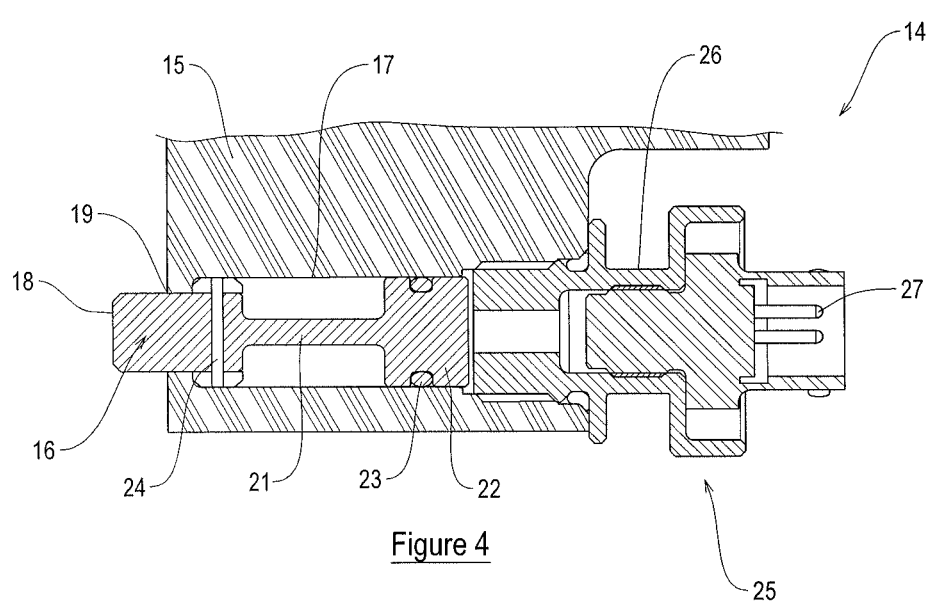
Figure 5:
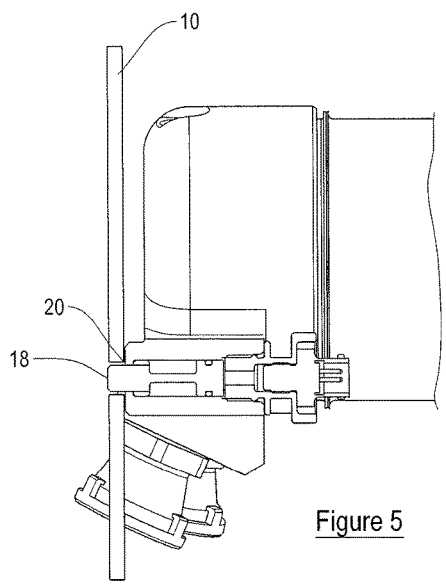
Figure 6:
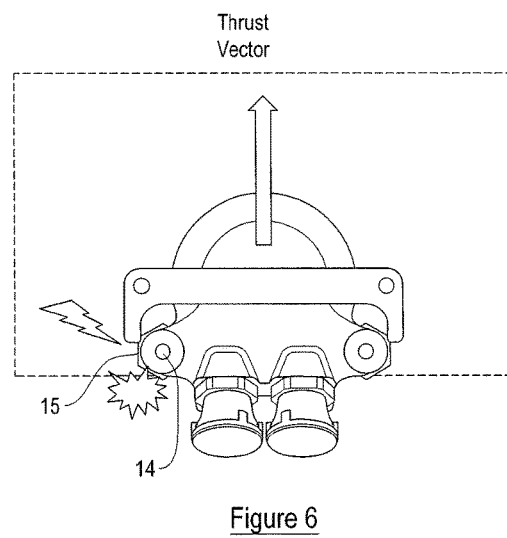
Figure 7:
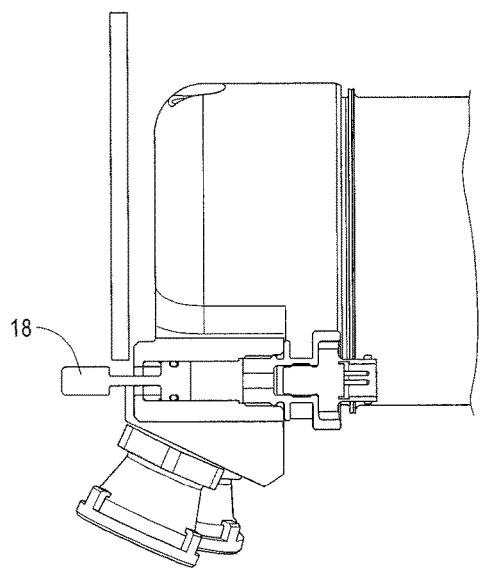
Figure 8:
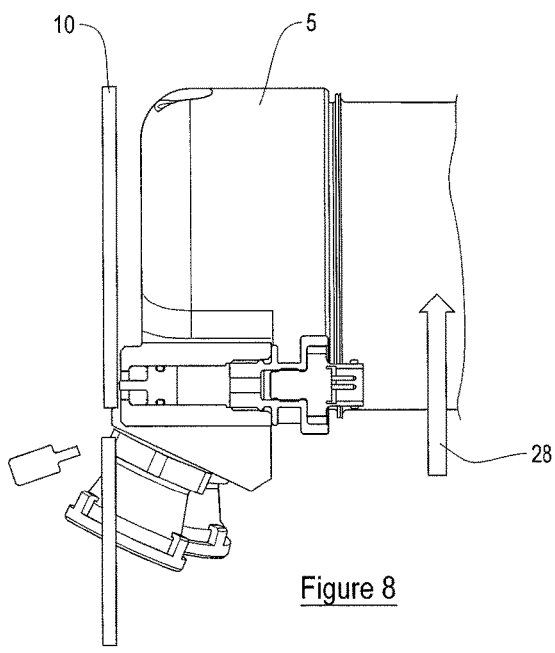
Figure 9:
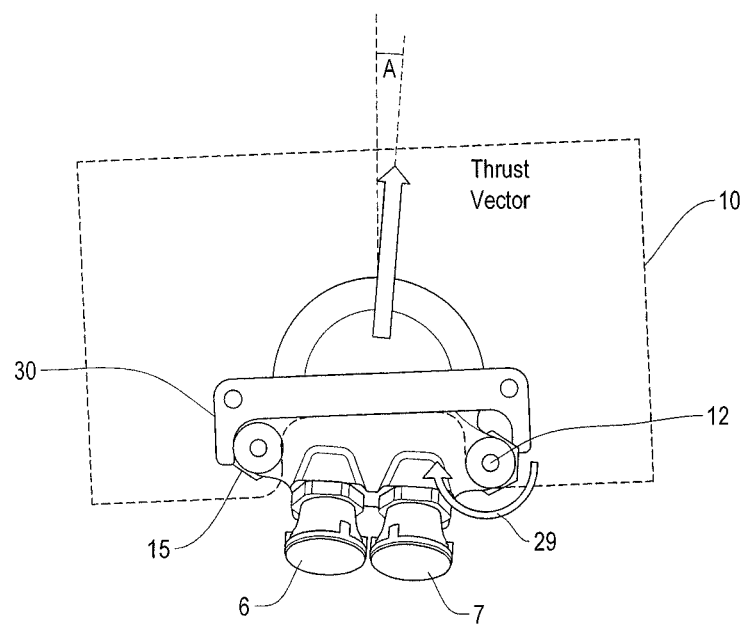
Figures 10, 11:
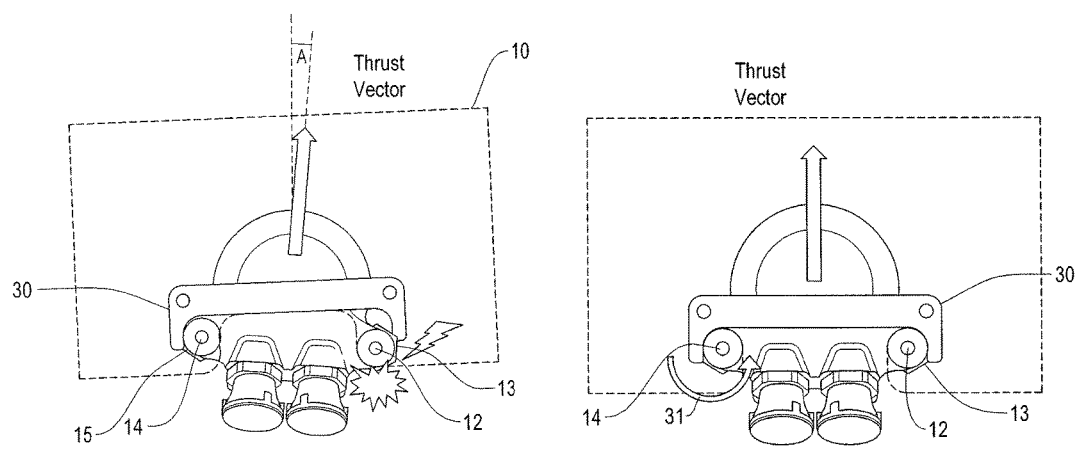
Figure 12:
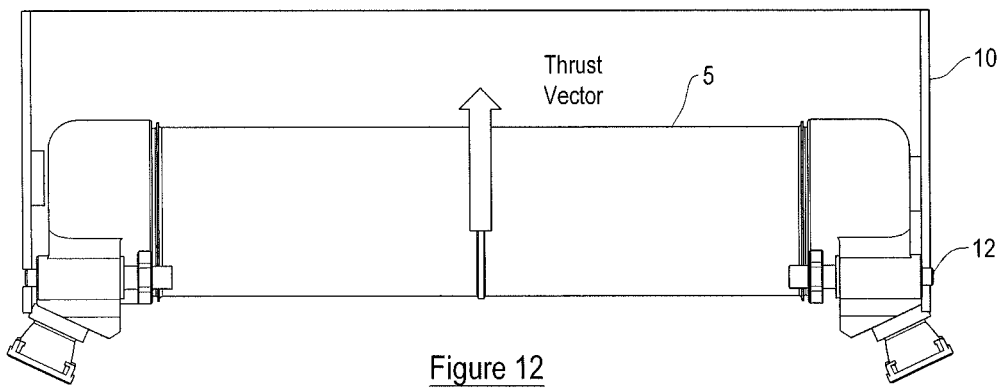
Figure 13:
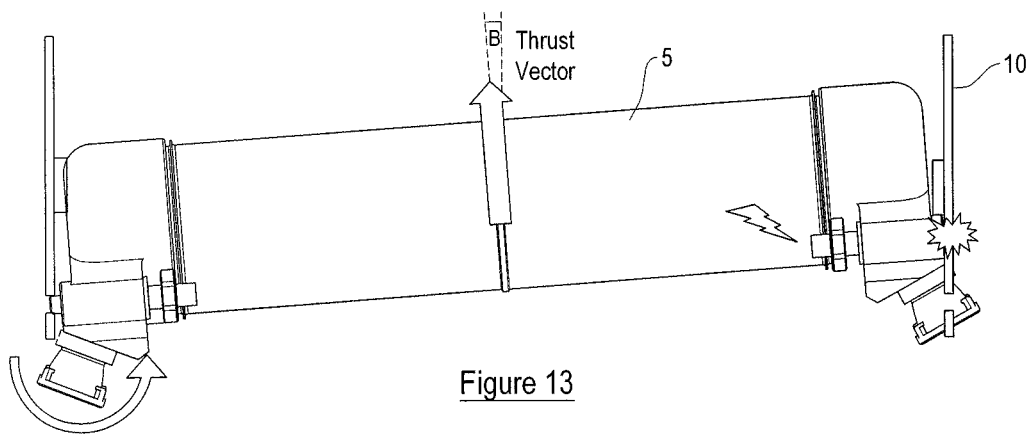
Figure 14:
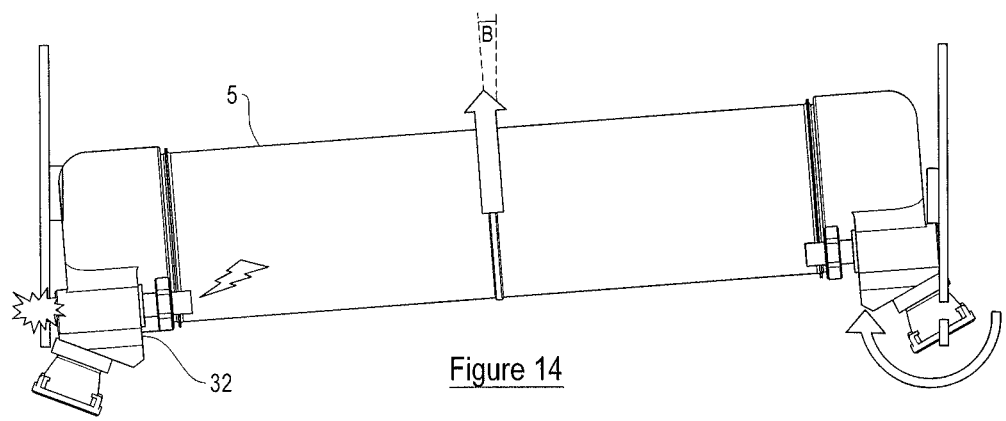
Figure 15:
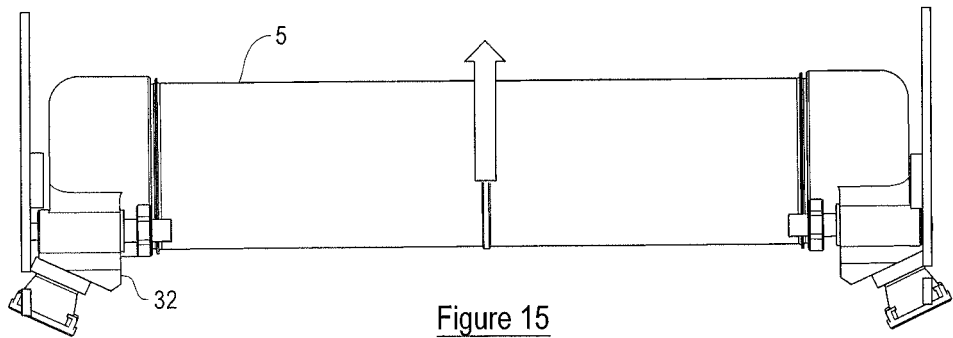

So that the present invention may be more readily understood, embodiments of the present invention will now be described, by way of example, with reference to the accompanying drawings, in which:

FIG. 1 is a schematic diagram of an aircraft ejection seat,

FIG. 2 is a schematic perspective view of a rocket motor assembly of an embodiment of the invention, FIG. 3 is a further schematic perspective view of the rocket motor assembly of FIG. 2, FIG. 4 is a schematic cut-away view of part of an actuator arrangement of an embodiment of the invention, FIG. 5 is a schematic part cut-away side view an actuator arrangement of an embodiment of the invention in a locked configuration, FIG. 6 is a schematic side view of a rocket motor assembly of an embodiment of the invention, FIG. 7 is a view corresponding to FIG. 5, with the actuator arrangement in an unlocked configuration, FIG. 8 is a view corresponding to FIG. 7, with the actuator arrangement permitting movement of a rocket motor assembly, FIG. 9 is a schematic side view of a rocket motor assembly during thrust vectoring in a pitch direction, FIG. 10 is a view corresponding to FIG. 9, with the rocket motor assembly undergoing further thrust vectoring in the pitch direction, FIG. 11 is a schematic side view corresponding to FIG. 10 showing a final thrust vector in the pitch direction, FIG. 12 is a schematic side view of a rocket motor assembly, FIG. 13 is a schematic side view corresponding to FIG. 12, showing the rocket motor assembly undergoing thrust vectoring in a roll direction, FIG. 14 is a schematic side view corresponding to FIG. 13, with the rocket motor assembly undergoing thrust vectoring in the roll direction, and FIG. 15 is a schematic side view corresponding to FIG. 14, with the rocket motor assembly at a final stage of thrust vectoring in the roll direction.

Referring now to FIGS. 2 and 3 of the accompanying drawings, a rocket motor assembly 3 of an embodiment of the invention comprises a rocket motor 4. The rocket motor 4 incorporates a rocket motor housing 5 which, in this embodiment, is an elongate and generally cylindrical housing. The rocket motor housing 5 houses a combustion chamber (not shown). In this embodiment, four gas outlets 6-9 are provided on the rocket motor housing 5 to output gas that is generated within the combustion chamber. In other embodiments, only one, two, three or more than four exhaust outlets are provided on the rocket motor housing 5.

The exhaust outlets 6-9 are in fluid communication with the combustion chamber and permit exhaust gas to be output from the rocket motor 4. The exhaust gas that is output from each of the exhaust outlets 6-9 provides a thrust force along a thrust vector. In this embodiment, the thrust vector of each exhaust outlet is generally perpendicular to the central elongate axis of the exhaust outlet 6-9, with the thrust line positioned substantially at the centre of the exhaust outlet 6-9.

Two of the exhaust outlets 6, 7 are positioned at one end of the rocket motor housing 5 and the other two exhaust outlets 8, 9 are positioned at the other end of the rocket motor housing 5. The exhaust outlets 6-9 at either end of the rocket motor housing 5 are angled downwardly relative to the rocket motor housing 5 and outwardly from opposing ends of the rocket motor housing 5. Thrust produced by the rocket motor 4 is output from the exhaust outlets 6-9 to lift the rocket motor 4.

The rocket motor 4 is configured to be carried by a support structure. In this embodiment, the support structure comprises two opposing, spaced-apart walls 10, 11 of an aircraft ejection seat. The walls of the ejection seat 10, 11 are attached to or formed integrally with the base of the ejection seat such that the rocket motor 4 is carried securely by the aircraft ejection seat. In other embodiments, the rocket motor 4 is carried by a different support structure which may be provided with the rocket motor 4 for attachment to an aircraft ejection seat. In other embodiments, the support structure is not formed by generally planar sheets, but is instead formed by another support structure which carries the necessary mounting points to couple the rocket motor 4 to the support structure.

The rocket motor assembly 3 further comprises a first rotational coupling 12 which rotationally couples a first part 13 of the rocket motor housing 5 to the support structure 10. The first rotational coupling 12 will be described in more detail below.

The rocket motor assembly 3 further comprises a releasable coupling 14 which releasably couples a second part 15 of the rocket motor housing 5 to the support structure 10. When the rocket motor 4 is in the normal, non-activated condition, the first rotational coupling 12 and the releasable coupling 14 retain the rocket motor 4 in position so that it is held relative to the support structure 10.

In this embodiment, the releasable coupling 14 and the first rotational coupling 12 are identical to one another. The same configuration is used for the releasable coupling 14 as the first rotational coupling 12. It is therefore to be appreciated that the first rotational coupling 12 is also a releasable coupling between the rocket motor housing 5 and the support structure 10. For simplicity, the releasable coupling 14 will be described in more detail below but it is to be appreciated that the description also applies to the first rotational coupling 12 in this embodiment of the invention.

Referring now to FIGS. 4 and 5 of the accompanying drawings, the releasable coupling 14 comprises a moveable locking element 16 which is retained partially within a chamber 17 in the second part 15 of the rocket motor housing 5.

The locking element 16 comprises a locking portion 18 which protrudes outwardly from an aperture 19 in a side wall of the rocket motor housing 5. The locking portion 18 protrudes through an aperture 20 which is provided in the support structure 10. The locking portion 18 engages with the support structure 10 to restrict translational movement of the rocket motor housing 5 relative to the support structure 10.

The locking element 16 further comprises a frangible portion 21 which connects the locking portion 16 to a drive head 22. The frangible portion 21 is of a reduced thickness compared to the locking portion 18.

The drive head 22 is provided with a sealing element 23 which runs around the periphery of the drive head 22 to provide a substantially gas-tight seal between the drive head 22 and the walls of the chamber 17. The locking element 16 is therefore configured to operate as a piston within the chamber or cylinder 17 in the rocket motor housing 5. The locking element 16 is, however, held in a fixed position within the chamber 17 by a shear member 24 with the locking portion 18 in engagement with the support structure 10.

The releasable coupling 14 further comprises a drive arrangement 25 which is configured to drive the locking element 16 to move within the chamber 17. In this embodiment, the drive arrangement 25 is a pyrotechnic gas generator 26 which incorporates an input 27. When an activation signal is received at the input 27, the pyrotechnic gas generator 26 is activated to generate gas which provides a force against the drive head 22 of the locking element 16. The force of the gas drives the locking element 16 to move outwardly from the side of the rocket motor housing 5 such that the locking portion 18 moves outwardly from the aperture 20 in the support structure 10, as shown in FIGS. 6 and 7. The releasable coupling 14 is then in an unlocked configuration, with the frangible portion 21 extending outwardly from the rocket motor housing 5 and through the aperture 20 in the support structure 10.

When the releasable coupling 14 is in the unlocked configuration, thrust force exerted by the rocket motor, as indicated generally by the arrow 28 in FIG. 8, moves the rocket motor housing 5 relative to the support structure 10. The thrust causes the support structure 10 to exert a force on the frangible portion 21 of the locking element 16 which is above a predetermined level. This force breaks the frangible portion 21 so that the rocket motor housing 5 undergoes a translational movement relative to the support structure 10, as shown in FIG. 8.

When the second part 15 of the rocket motor housing 5 is released, the thrust exerted by the rocket motor 4 causes the rocket motor housing 5 to rotate about the rotational coupling 12, as indicated generally by the arrow 29 in FIG. 9.

The thrust vector provided by the exhaust gas that is output from the exhaust outlets 6, 7 moves to an angle A relative to a first plane of the support structure. In this embodiment, the first plane is the planar face of the side wall of the seat. The change in the angle of the thrust vector from generally vertical, as shown in FIG. 6, to the angle A, as shown in FIG. 9 achieves thrust vectoring which adjusts the thrust vector of the rocket motor 4 relative to the support structure 10 and hence the aircraft ejection seat.

The second part 15 of the rocket motor housing 5 moves until it engages with a blocking element 30 which is provided on the support structure 10. The blocking element 30 retains the rocket motor housing 5 in the angled configuration, with the thrust vector at the angle A relative to the first plane of the support structure 10, as shown in FIG. 9.

In this embodiment of the invention, the entire rocket motor housing 5 moves relative to the support structure 10 in order to change the angle of the thrust vector of the rocket motor 4. The entire rocket motor housing 5 also moves relative to an aircraft ejection seat which, in use, carries the support structure 10. The rocket motor assembly 3 can therefore perform thrust vectoring to change the thrust vector of the rocket motor 4 in order to stabilise and correct the trajectory of the acceleration of the ejection seat. The rocket motor assembly performs thrust vectoring without the need for baffles or other moveable elements which are placed in the path of the exhaust outlets of the rocket motor 4. An embodiment of the invention can therefore avoid the additional weight and maintenance problems associated with using baffles for thrust vectoring.

In this embodiment of the invention, a control arrangement (not shown) is provided to output activation signal to each of the releasable couplings to selectively activate the releasable couplings in order to perform thrust vectoring. The control arrangement preferably comprises a gyroscopic sensor which is coupled to a processing unit. The processing unit is configured to receive signals from the gyroscopic sensor, calculate the pitch and/or roll rate of the support structure. If the pitch and/or roll rate higher than a predetermined level, then the control arrangement provides an activation signal to at least one of the releasable couplings in order to activate the at least one releasable coupling. The control arrangement can therefore determine the thrust vectoring that must be performed in order to stabilise and correct the trajectory of the acceleration of the ejection seat and activate the appropriate releasable couplings in order to perform thrust vectoring to stabilise and correct the trajectory and acceleration of the ejection seat.

In one embodiment, the control arrangement is configured to activate the releasable couplings selectively in a predetermined sequence which is determined by the processing unit in response to sensed perimeters that affect the movement of the ejection seat.

The continued thrust vectoring by activation of the further releasable couplings is described in more detail below.

Referring now to FIG. 10 the accompanying drawings, the first rotational coupling 12 which is also a second releasable coupling is configured, upon receipt of a second activation signal, to release the first part 13 of the rocket motor housing 5 from the support structure 10 to permit the rocket motor housing 5 to rotate about a second rotational coupling that is provided by the blocking element 30, as indicated generally by arrow 31 in FIG. 11. This rotational movement adjusts the thrust vector so that the thrust vector is no longer at an angle A, but is instead at the same or substantially the same angle as the angle of the initial thrust vector when neither of the first and second releasable couplings were activated.

This second adjustment of the thrust vector adjusts the pitch of the thrust of the rocket motor 4 in order to compensate for a pitch in the aircraft ejection seat which is above a predetermined level.

Referring now to FIGS. 12 and 13 of the accompanying drawings, it can be seen that the selective release of the releasable couplings 12, 14 which are at one end of the rocket motor housing 5 causes that end of the rocket motor housing 5 to move upwardly relative to the support structure 10. This movement adjusts the angle of the thrust vector in a roll direction from substantially vertical, as shown in FIG. 12, to an angle B, as shown in FIG. 13. The angle B is indicated relative to a second plane that is perpendicular to the first plane. The activation of the releasable couplings 12, 14 can therefore perform thrust vectoring in a roll direction.

Referring now to FIG. 14 of the accompanying drawings, the rotational and releasable couplings provided at the other end of the rocket motor housing 5 are configured to operate in the same manner as the first rotational/releasable couplings 12, 14. The rotational/releasable couplings at the other end of the rocket motor housing 5 may be activated selectively to move a fourth part 32 of the rocket motor housing 5 in order to perform thrust vectoring to adjust the angle of the thrust vector from the angle B, as shown in FIG. 14, back to the vertical thrust vector, as shown in FIG. 15.

The selective activation of the releasable couplings at each of the four respective corners of the rocket motor housing 5 can therefore change the angle of the thrust vector so that the rocket motor 4 "walks" from an initial angle to an inclined roll/pitch angle and then back to the initial angle.

While, in the embodiment described above, there are two pairs of rotational/releasable couplings, in another embodiment there is only one rotational/releasable coupling pair.

In a further embodiment, the rocket motor housing is coupled to the support structure by two rotational couplings and one releasable coupling. In still further embodiments, the rocket motor housing is coupled to the support structure by more than two rotational couplings and at least one releasable coupling.

In certain embodiments, the rotational couplings are not necessarily also configured to operate as releasable couplings.

In one embodiment, the rocket motor assembly is configured to permit selective thrust vectoring in only one predetermined angle in the roll or pitch direction.

In other embodiments, the rocket motor assembly is configured to permit selective thrust vectoring in multiple angles in each roll and/or pitch direction. For instance, a second activation signal may be configured to release an additional releasable coupling that enables the angle of the thrust vector to be increased by a second or further amount in order to provide additional compensation to stabilise an aircraft ejection seat.

In further embodiments, the releasable coupling is a different releasable coupling from the releasable coupling described above. In other embodiments, the releasable coupling is another mechanism which, when activated, moves a locking element from a locked position in which the rocket motor housing is coupled to the support structure to an unlocked position in which the rocket motor housing is uncoupled from the support structure. For instance, in one embodiment, the releasable coupling is a pull pin releasable coupling When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A rocket motor assembly for use with an aircraft ejection seat, the rocket motor assembly comprising:
   a rocket motor which incorporates:
      a rocket motor housing; and
      an exhaust outlet provided on the rocket motor housing to permit exhaust gas to be output from the rocket motor along a thrust vector;
   wherein the rocket motor assembly further comprises:
      a first rotational coupling which is configured to rotationally couple a first part of the rocket motor housing to a support structure; and
      a releasable coupling which is configured to releasably couple a second part of the rocket motor housing to the support structure such that the rocket motor housing is held relative to the support structure with the thrust vector of exhaust gas output from the exhaust outlet at a first angle relative to a first plane of the support structure;
      wherein the releasable coupling is configured, upon receipt of a first activation signal, to release the second part of the rocket motor housing from the support structure to permit the rocket motor housing to rotate about the rotational coupling so that the rocket motor housing moves relative to the support structure so that the thrust vector of exhaust gas output from the exhaust outlet is at a second angle relative to the first plane of the support structure.

2. The rocket motor assembly of claim 1, wherein the rocket motor assembly further comprises:
   a support structure which is coupled to the rocket motor housing by the first rotational coupling and the releasable coupling.

3. The rocket motor assembly of claim 1, wherein the rocket motor housing is configured to move into contact with a blocking element which is configured to be carried by the support structure at a predetermined position.

4. The rocket motor assembly of claim 3, wherein the blocking element provides a second rotational coupling between the rocket motor housing and the support structure.

5. The rocket motor assembly of claim 1, wherein the first rotational coupling is also a second releasable coupling which is configured, upon receipt of a second activation signal, to release the first part of the rocket motor housing from the support structure to permit the rocket motor housing to rotate about the second rotational coupling provided by the blocking element so that the rocket motor housing moves relative to the support structure so that the thrust vector of exhaust gas output from the exhaust outlet is at a third angle relative to the first plane of the support structure.

6. The rocket motor assembly of claim 5, wherein the third angle is substantially the same as the first angle relative to the first plane of the support structure.

7. The rocket motor assembly of claim 1, wherein the rocket motor assembly further comprises:
  a third rotational coupling which is configured to rotationally couple a third part of the rocket motor housing to the support structure;
  a third releasable coupling which is configured to releasably couple a fourth part of the rocket motor housing to the support structure;
  wherein the third releasable coupling is configured, upon receipt of a third activation signal, to release the fourth part of the rocket motor housing from the support structure to permit the rocket motor housing to rotate about the third rotational coupling so that the rocket motor housing moves relative to the support structure and so that the thrust vector of exhaust gas output from the exhaust outlet is at a fourth angle relative to a second plane of the support structure, wherein the second plane is perpendicular to the first plane.

8. The rocket motor assembly of claim 7, wherein the rocket motor housing is configured to move into contact with a further blocking element which is configured to be carried by the support structure at a predetermined position.

9. The rocket motor assembly of claim 8, wherein the further blocking element provides a fourth rotational coupling between the rocket motor housing and the support structure.

10. The rocket motor assembly of claim 7, wherein the third rotational coupling is also a fourth releasable coupling, which is configured, upon receipt of a third activation signal, to release the third part of the rocket motor housing from the support structure to permit the rocket motor housing to rotate about the fourth rotational coupling provided by the further blocking element so that the rocket motor housing moves relative to the support structure so that the thrust vector of exhaust gas output from the exhaust outlet is at a fifth angle relative to the second plane of the support structure.

11. The rocket motor assembly of claim 1, wherein each releasable coupling comprises:
  a locking element which is configured to be moved by an actuator between a locked position in which the locking element restricts translational movement of the rocket motor housing relative to the support structure and an unlocked position which permits translational movement of the rocket motor housing relative to the support structure.

12. The rocket motor assembly of claim 11, wherein the actuator is a piston and cylinder arrangement that is activated by a source of gas.

13. The rocket motor assembly of claim 12, wherein the source of gas is a pyrotechnic gas generator.

14. The rocket motor assembly of claim 12, wherein the source of gas is remote from the rocket motor.

15. The rocket motor assembly of claim 11, wherein the locking element comprises:

a locking portion which is configured to engage with part of the rocket motor housing and part of the support structure to restrict translational movement of the rocket motor housing relative to the support structure; and
  a frangible portion which is configured to be broken by a force which is exerted by the support structure on the frangible portion that is above a predeteitnined level to permit translational movement of the rocket motor housing relative to the support structure.

16. The rocket motor assembly of claim 1, wherein the rocket motor housing is driven to move relative to the support structure by the thrust force of gas output from the rocket motor.

17. The rocket motor assembly of claim 1, wherein the rocket motor assembly further comprises a control arrangement which incorporates:
  an output that is configured to provide activation signals to each of the releasable couplings;
  a gyroscopic sensor;
  a processing unit that is configured to receive signals from the gyroscopic sensor, calculate the pitch or roll rate of the support structure and, if the pitch or roll rate is higher than a predetermined level, to provide an activation signal to at least one of the releasable couplings.

18. The rocket motor assembly of claim 17, wherein the control arrangement is configured to provide activation signals to a plurality of the releasable couplings in a predetermined sequence.

19. The rocket motor assembly of claim 1, wherein the support structure is configured to be carried by an aircraft seat.

20. An aircraft seat comprising the rocket motor assembly of claim 1.

21. A method of operating a rocket motor assembly for use with an aircraft ejection seat, wherein the rocket motor assembly comprises:
  a rocket motor which incorporates:
    a rocket motor housing; and
    an exhaust outlet provided on the rocket motor housing to permit exhaust gas to be output from the rocket motor along a thrust vector;
  a first rotational coupling which is configured to rotationally couple a first part of the rocket motor housing to a support structure; and
  a releasable coupling which is configured to releasably couple a second part of the rocket motor housing to the support structure such that the rocket motor housing is held relative to the support structure with the thrust vector of exhaust gas output from the exhaust outlet at a first angle relative to a first plane of the support structure;
  wherein the method comprises:
  activating the releasable coupling to release the second part of the rocket motor housing from the support structure to permit the rocket motor housing to rotate about the rotational coupling so that the rocket motor housing moves relative to the support structure so that the thrust vector of exhaust gas output from the exhaust outlet is at a second angle relative to the first plane of the support structure.

* * * * *